US009275203B1

(12) United States Patent
Rice (10) Patent No.: US 9,275,203 B1
(45) Date of Patent: Mar. 1, 2016

(54) METHODS, SYSTEMS, AND COMPUTER READABLE MEDIA FOR PREVENTING SOFTWARE PIRACY AND PROTECTING DIGITAL DOCUMENTS USING SAME (71) Applicant: Purdue Research Foundation, West Lafayette, IN (US)

(72) Inventor: John R. Rice, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 31 days.

(21) Appl. No.: 14/171,398

(22) Filed: Feb. 3, 2014

(51) Int. Cl.
*G06F 7/04* (2006.01)
*G06F 21/16* (2013.01)
*G06F 21/10* (2013.01)
*G06F 21/72* (2013.01)
*G06F 21/86* (2013.01)

(52) U.S. Cl.
CPC ............... *G06F 21/16* (2013.01); *G06F 21/10* (2013.01); *G06F 21/72* (2013.01); *G06F 21/86* (2013.01)

(58) Field of Classification Search
CPC .......... G06F 2/10; G06F 21/10; G06F 21/72; G06F 21/86; G11B 20/000086; G11B 20/0021; G11B 20/00086
See application file for complete search history.

(56) References Cited

U.S. PATENT DOCUMENTS

| 7,287,166 | B1* | 10/2007 | Chang .................... G06F 21/54 713/176 |
| 7,409,561 | B1 | 8/2008 | Kolli et al. |
| 7,503,072 | B2* | 3/2009 | Hughes et al. ................. 726/26 |
| 7,565,323 | B2 | 7/2009 | Hughes et al. |
| 2004/0010717 | A1 | 1/2004 | Simec et al. |
| 2004/0015613 | A1 | 1/2004 | Ikeda |
| 2006/0031686 | A1* | 2/2006 | Atallah ............... G06F 12/1408 713/190 |
| 2008/0189789 | A1 | 8/2008 | Lamontagne |
| 2008/0263366 | A1 | 10/2008 | G |
| 2009/0106207 | A1* | 4/2009 | Solheim et al. .................... 707/3 |
| 2009/0288174 | A1* | 11/2009 | Wilson .................... G06F 21/16 726/30 |
| 2010/0262963 | A1* | 10/2010 | Wassermann et al. ........ 717/178 |
| 2012/0036370 | A1* | 2/2012 | Lim et al. ...................... 713/189 |

OTHER PUBLICATIONS

Jowitt, "Virtualization users should expect more attacks," http://www.infoworld.com/d/virtulization, pp. 1-2 (Sep. 8, 2008).
Dignan, "Virtualization: What are the security risks?," http://www.zdnet.com/blog/security/virtualization-what-are-the-security-risks/821 (Jan. 22, 2008).
Dinaburg et al., "Ether: Malware Analysis via Hardware Virtualization Extensions," http://ether.gtisc.gatech.edu/ether_ccs_2008.pdf, pp. 1-12 (2008).

* cited by examiner

*Primary Examiner* — Ali Abyaneh
*Assistant Examiner* — Shaqueal Wade
(74) *Attorney, Agent, or Firm* — Jenkins, Wilson, Taylor & Hunt, P.A.

(57) ABSTRACT

The subject matter described herein includes methods, systems, and computer readable media for preventing software piracy. One method includes specifying at least one codemark that is intrinsic to a computing system. The method further includes inserting guard code in an application. The guard code including a first code portion that uses a codemark and produces an output that depends on a value of the codemark and a second code portion that uses the output of the first code portion. The method further includes executing the first and second code portions and selectively triggering a protective action based on the output of the second code portion. Multiple types, styles, and frequencies of guard codes can be used to provide in-depth, long lasting, and strong protection.

39 Claims, 5 Drawing Sheets

METHODS, SYSTEMS, AND COMPUTER READABLE MEDIA FOR PREVENTING SOFTWARE PIRACY AND PROTECTING DIGITAL DOCUMENTS USING SAME

TECHNICAL FIELD

The subject matter described herein relates to preventing software piracy. More particularly, the subject matter described herein relates to methods, systems, and computer readable media for preventing software piracy and protecting digital documents using software piracy prevention methods.

BACKGROUND

Software piracy is the unauthorized use or copying of software onto a machine or medium on which use of the software is not authorized. Software piracy costs companies billions of dollars in losses each year. For example, the Software Business Alliance estimates that over thirty-five percent of software applications in the world are pirated. This currently results in a yearly sales loss of about fifty billion dollars.

Current software anti-piracy methods, such as encryption, have only had modest success. For example, if a user has a product key, in some instances, the software can still be used beyond the scope of the original software license.

Another software antipiracy method is the use of guard code in an application. One type of guard reads a value stored in a computing system to determine whether or not the application is authorized to execute on the computing system. A problem with using guards is that their actions can be detected and used when the software is moved to a new computing system. For example, if an application includes guard code that receives a system-specific value before executing, the read operation can be detected, and the system specific value can be copied to a new computing system. When the application is copied to the new computing system, because the correct system-specific value is present, the application will execute on the new application, even though the application is not authorized to be executed on the new computing system.

In addition to the problem of preventing software piracy, it may be desirable to protect documents readable on computing systems such that the documents can only be read by a specific reader application located on an authorized computing system. Because reader applications can be pirated, protecting documents in this manner can be difficult. Accordingly, there exists a need for methods, systems, and computer readable media for preventing software piracy and for protecting digital documents using software piracy prevention methods.

SUMMARY

The subject matter described herein includes methods, systems, and computer readable media for preventing software piracy and protecting digital documents using same. One method includes specifying at least one codemark that is intrinsic to a computing system. The method further includes inserting guard code in an application. The guard code including a first code portion that uses a codemark and produces an output that depends on a value of the codemark and a second code portion that uses the output of the first code portion. The method further includes executing the first and second code portions and selectively triggering a protective action based on the output of the second code portion.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

For the purposes of promoting an understanding of the principles of the subject matter described herein, reference will now be made to the embodiments illustrated in the drawings and specific language will be used to describe the same. It will nevertheless be understood that no limitation of the scope of the subject matter described herein is thereby intended, such alterations and further modifications in the illustrated device, and such further applications of the principles of the subject matter described herein as illustrated therein being contemplated as would normally occur to one skilled in the art to which the subject matter described herein relates. At least one embodiment of the subject matter described herein will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the subject matter described herein, it is understood that yet other embodiments may not include those same advantages, or may include yet different advantages. Any advantages described herein are not to be construed as limiting to any of the claims.

A method and system is presented herein to prevent software piracy by securely tying or coupling an application, referred to hereinafter as the "AppX," to a computer system, referred to hereinafter as the "System," for which it as originally intended or licensed. The connection between the AppX and the System uses "codemarks" that uniquely identify the System and that are connected or operatively coupled to protective guards present in the AppX. When a guard detects or senses that a codemark is wrong, an incorrect computation is generated or defensive actions are taken. The actions of some guards are preferably delayed and/or intermittent so an attacker or pirate never knows if all the protection or safeguards have been disabled.

For purposes of this disclosure, consider any software application AppX for sale to the public that is easy to copy, in which case piracy of such software is rampant. As stated above, the Software Business Alliance ("SBA") estimates that 35% of the software applications in the world are pirated, which results in a yearly sales loss of about USD $50 Billion. Several conventional anti-piracy methods are in use, but have had only moderate success.

There are various types of attacks of a computer system:

Analysis of the AppX. One studies the AppX, its specifications and its code, and then re-implements the AppX without its embedded protection. This is a burdensome task, requiring as much effort as writing the AppX code from scratch and is not of high practical concern.

Object Code Copy. One copies the object code and analyses it to identify all access to external data. One then retrieves this data and replicates it inside the new AppX and modifies the references, etc. If the AppX is well obfuscated, this requires as much work as re-implementing the AppX.

Remove the Protection. In this instance one merely removes the protection from the AppX. The protection provided by the subject matter described herein is extremely difficult to remove or negate.

Thus, described herein is a new anti-piracy method and system for the most common situation where the application ("AppX") is installed on a single computer system ("System") for which it is intended or licensed. The method and system ties or closely couples the code of the AppX to the System so that the AppX does not execute or function properly in the event the AppX is copied from the original System for which it was intended and an attempt is made to run the AppX on another computer for which it was not intended or licensed. Preferably, the AppX is obfuscated, made tamper-proof and, assuming there are no protection installation errors, the protection afforded by the subject matter described herein: (1) eliminates the threat of direct virtualization attacks as they are of little or no help to pirates; and (2) makes code analysis attacks extremely difficult if the object code is obfuscated because the object code has no "flags" that easily identify the guards or codemarks for the pirate or attacker.

In one embodiment of the subject matter described herein, the coupling of AppX to the System uses codemarks that uniquely identify the System and software guards that take defensive actions, such as, for example, corrupting the computations, if the AppX is moved from that System. The strength of the protection comes from the fact that the guards are very difficult to identify and that the codemarks are either intrinsic to the System or very small and hard to identify. By "intrinsic," it is meant they are standard components of a computer system, such as a User's name, password, email address and the like. Codemarks are like watermarks or brands on livestock: they are small, distinctive, unobtrusive and hard to find if one does not know where to look. Generally, the more guards the AppX utilizes, the stronger the protection. In the very rare case there are not enough codemarks, then one can create more codemarks either by manipulating existing codemarks to create additional ones or by inserting more code into AppX.

The guards are independent and can be "activated" in many different ways. (A guard is "independent" in that no guard depends on any other guard. Thus, if AppX were protected by 64 silent guards and 63 of them were removed or disabled, the $64^{th}$ guard would still be active and serve to protect AppX.) Some guards are activated infrequently or have long delays so a pirate (or his customer) never knows if all of the guards have been disabled. Guards can also initiate overt defensive actions, such as "attacking" the AppX and/or the System if the AppX is moved from the original System. Even stronger piracy protection is obtained if the AppX is obfuscated and made tamper-proof after the silent guards are inserted.

It is important to couple or tie the AppX to the System securely. Codemarks may be used to identify the System and both ordinary and silent software guards may be used to detect and to respond appropriately if the AppX is moved away from the original System to which it was initially tied or coupled. A principal challenge is the recent virtualization attacks on software that allow one to "observe" all kinds of actions, "keys" and "passwords," so a piracy defense should not depend solely on protective encryption. Virtualization attacks are completely ineffective in identifying and/or attacking this protection as it is based on silent guards, which present no "flags" to detect them. A preferred level of protection is to require the extent of the work necessary to untie or uncouple the AppX from the System to equal that work required to simply re-implement the AppX.

Software Codemarks

Codemarks are small, inconspicuous items (a byte or perhaps a word) that uniquely identify the System. Much like a watermark, a codemark can be seen if one knows where or how to look for it. The codemarks of the subject matter described herein use user specific items of the System. (See examples given below.) One should keep in mind that items inserted into standard components of the System by the AppX installers are easily identified, so codemarks must be "pre-existing" or "natural." An incorrect codemark value triggers protective actions automatically and silently. The codemarks are to be in user dependent/controlled components and data to avoid any problems with the System level maintenance. The codemark information used is quite varied as guards operate on simple data extracted from the codemarks. A few user specific values can be massaged, combined and manipulated to generate dozens (even hundreds) of distinct codemarks. Codemarks are identified and/or created during the installation of the AppX.

Guards

Guards are small pieces of code (i.e., Code1A) related to other codes (i.e., Code1B), so that if Code1A is modified, then Code1B becomes incorrect. The two code pieces need not be close together or otherwise related. In addition, one need not always know exactly what the consequences are of a code modification. Here, Code1A involves the codemarks to produce values used in and needed by Code1B. If the codemarks are incorrect, then Code1B is corrupted. Guards are preferably obfuscated and made tamper-proof for additional protection. There should be a sufficient number of guards to provide security even if some of the guards are modified or possibly even disabled. Simple guard examples are shown below:

Active Guards. Suppose codemark values M1 and M2 should be 3 and 5 and that the AppX uses the variable V. Then: test if $V+M1+M2+2=V+10$; if not, then take a defensive action. The test provides a clue to the existence and location of the guard, but obfuscation can make this risk very small and the AppX should use many of these active guards.

Figure 1:
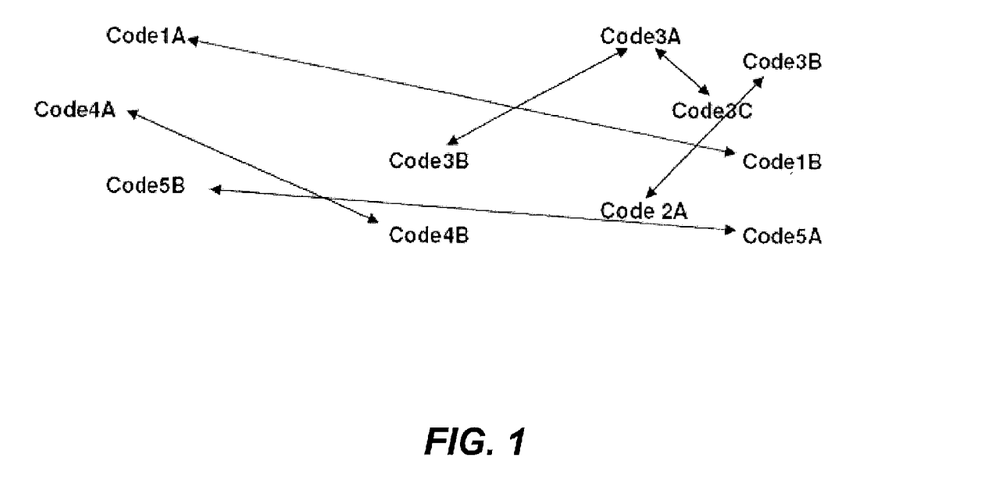
FIG. 1 is a schematic diagram illustrating exemplary silent guard protection in an application AppX according to an embodiment of the subject matter described herein.

Silent Guards. Suppose the codemark M should have the value 2. Insert the expression $(x+y)^2-x^2-M*x*y-y^2$ someplace in the AppX's computations. This has no effect on the results unless M is changed. If M is not 2, then this corrupts AppX wherever the expression is inserted in AppX. Silent guards are difficult to detect and often generate an unknown result. As noted, a guard consists of two parts. The first part, CodeA, is where a guarded value V is computed using program data and codemarks. The second part, CodeB, is where V is used as an ordinary program variable in normal program code. FIG. 1 is a schematic diagram illustrating exemplary silent guard protection in application AppX. In FIG. 1A, code 1A produces a guarded value V using a mathematical expression, such as the expression described above. M may be a codemark intrinsic to the computing system on which AppX executes. For example, M may be the hash of a user's login ID, which has an expected value. Code1B may use the output of Code1A as a normal program variable. For example, Code1B may be the part of a document reader that opens a document to display the document on the screen. Code1B may use the output of Code1A as the value of a variable that instructs the document reader after the address of the beginning of the file for the document. If the output of Code1A is incorrect, the file for the document may not be found and the document may not be opened, causing the program to fail.

In another example, Code1B might produce data used in several completely unrelated codes so the protection "diagram" can be more complex than the sample illustration presented in FIG. 1. Code 3A produces values used in two places—Code 2B and Code 3C. One does not need to analyze or predict what the effect of an incorrect codemark will be. There should be some silent guards in the code of AppX that are rarely executed. It is easy to identify appropriate locations in AppX for such guards unless AppX is very short (say, less than 50 or 100 machine language statements). In this case, AppX is probably not worth protecting. For example, if AppX is a document reader, it may be desirable to place the guard in an infrequently accessed portion of the document reader, such as a portion that reads a rarely used file format.

Delayed Action Guards. These guards can provide long term protection for the AppX. For example, some guards might be active (a) on Mondays, (b) between 6 and 7 AM, (c) every $48^{th}$ time AppX is executed, (d) at random with probability 1/83, or (e) when rare events occur (such as when the value of X731 ends in 4813 or the value of C12*A87 ends in 16017).

Embedded Guards. One embeds a guard in an existing constant in the AppX. Consider the constant V29 and codemark value M37. Then, when V29 is created or read, compute V29nu=V29/M37 and then replace V29 by V29nu*M37 everywhere it is used.

Protection Codemarks

During the installation of the AppX protection, one only uses "user specific" codemark data in the System to identify it. These are preferably user/System values where one selects some that will, at most, very seldom be changed. For example, Microsoft Windows systems have standard user-related data containing natural codemark candidates such as: Contacts, Desktop, Documents, Favorites and Settings. Further sources are in data-like email addresses, user passwords, etc. A data "item" is usually too long to be a codemark, so a few bytes are taken from an item to be the actual codemarks (this greatly increases the number of codemark values available). Codemarks may also be used more than once. Examples set forth below discuss how codemarks may be identified and lists the types of artificial codemarks that one can create. Some of these methods are less secure than others but they do provide additional protection. Some codemarks can be hidden inside the AppX, but this is not the preferred method because "diff" attacks will reveal them. Making diff attacks is additional work for attackers but serious ones do it routinely. For clarification, a diff attack is as follows: One takes copies of AppX from two different computer systems and calls them, for example, AppX1 and AppX2. Assuming the applications have not been tamper-proofed or obfuscated, one then takes the difference between AppX1 and AppX2, resulting in the only difference being the codemarks and values depending on those codemarks. This results in the codemarks becoming easily identified. A diff attack can be defeated, however, after AppX is protected by using different obfuscations of AppX1 and AppX2 after they are protected.

Security Issues

There are at least four (4) principal questions about the security of any software protection:

a. Should there be multiple versions of the AppX with different protections? Generally no, because a pirate can compare different versions of the AppX to assist in analyzing and disabling the protection. Of course, codemark values themselves vary, but the code that uses them should not.

b. How many guards and codemarks are needed to provide very high security? It is difficult to quantify security strength, but a few dozen provide very high security because all of the guards and codemarks must be removed to make the AppX usable outside or apart from the original System for which it was intended or licensed. Different delays and actions provide long-term security. Guards are small and easy to install, and even 25, for example, might be ample as all guards must be removed to make the AppX usable on another system. If a vendor, but not the "original owner" of the AppX, desires more protection, they can provide it so long as it's done carefully as taking differences of two versions only reveals the new protections. This adds another difficult task for pirates. Individualized obfuscation makes this safer.

c. How useful are the delays? Delayed protections based on rare (or unpredictable) events are important. Some guards preferably use random (and sometimes rare) triggers. If some of the guards are heavily delayed, then a pirate might be misled into thinking that the AppX has become unprotected. A similar subtle strategy is to have some of the original protections be heavily delayed and add individualized protections with small delays. Some delayed guards should have "short" delays in case pirates are not aware of them.

d. Should the AppX be obfuscated and made tamper-proof? Yes, because it greatly increases the level of protection.

e. Multiple protections of the same code often lead to easier analysis for serious attackers. Consequently, while effort is probably better spent in improving a single "universal" protection, using both "universal" and individualized protections complicates a pirate's task.

f. Finally, if one has a test for execution on a virtual operating system (OS), then that should be included in the guard strategy. Perhaps a timing test by another computer during installation would be able to detect a virtual OS.

The Protection Process

Figure 2:
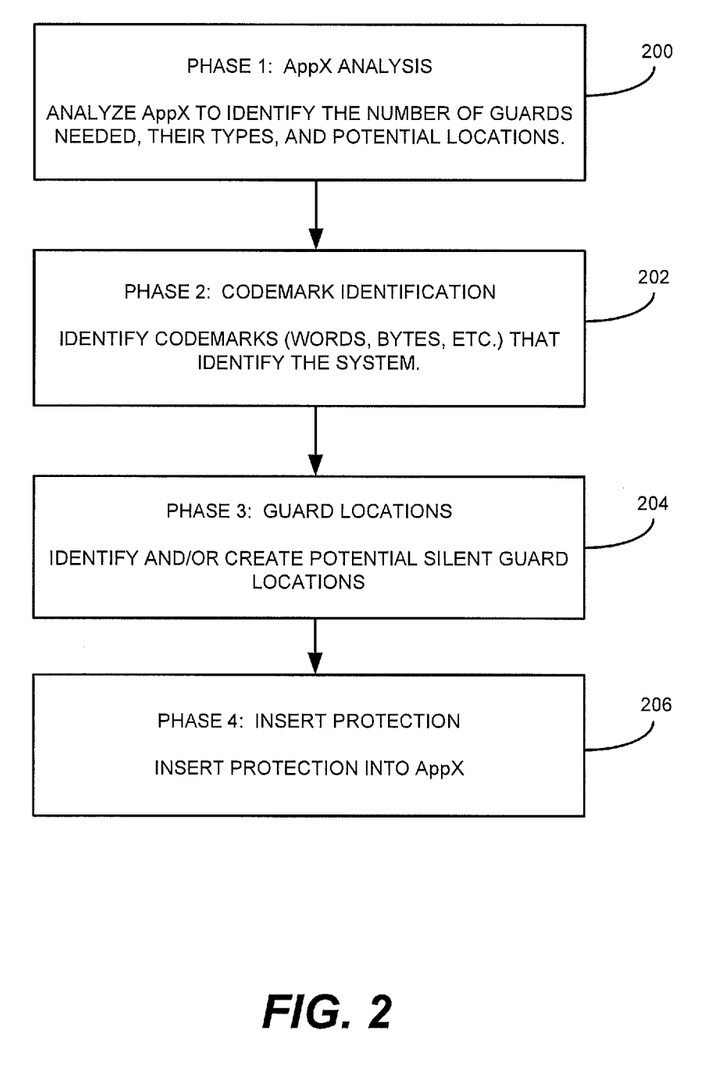
FIG. 2 is a flow chart illustrating an exemplary protection process using guards and codemarks according to an embodiment of the subject matter described herein.

The process of the subject matter described herein preferably has 4 phases as illustrated in FIG. 2.

Referring to FIG. 2, in step 200, an application is analyzed to identify the number of guards needed, the guard types, and potential locations. The number (and usually the types) of guards needed depends primarily on the strength of protection desired. Very long term and very strong protection requires very complex and subtle guarding. Run of the mill code can often be replaced by new code written from scratch; it's just faster and cheaper to steal someone else's code. In step 202, codemarks are created or identified. Codemarks are just "fragments of code" that identify pieces of code. The better codemarks are "unusual" but they need not be. Thus the program statement $$X13=17.275*Y21+Com22$$

can generate the codemarks "275", "m22", "5*Y", "17.25", etc. Real code would provide longer codemarks so there is little chance of accidental equality among them (it is not a disaster if 2 are accidentally equal; it just slightly reduces the strength of the protection). Normally, there are many appropriate codemarks present on a computing system; but, if not, then codemarks can be created as described in Example 1 below. Codemarks need not be individually unique to the system. However, in aggregate, they must uniquely identify the system. One long item in the system may generate many codemarks by extracting subsets, and rearranging the values. Example codemarks are described in Example 1.

In step 204, potential silent guard locations are identified and/or created. A silent guard consists of short code fragments, such as Code1 and Code2, so that if Code1 is incorrect, then Code2 becomes incorrect with a high probability. Thus, Code1 computes a guarded value V that depends on a codemark and Code2 uses V in its computations. Code2 does not take an overt action. In fact, it is desirable to avoid overt actions as they provide clues for attackers to identify silent guards.

In step 206, the protection is inserted in the application. The protection may be simply causing the application to malfunction. Continuing with the example, the output of Code2 may be used elsewhere in AppX and, if the output is contaminated by codemark incorrectness, the computations may become unreliable. It is unlikely but possible that one of the following will happen:

a) The output of Code1 is still correct (in which case nothing goes wrong) and the guard is ineffective; or b) The output of Code1 is incorrect but the output of Code2 is still correct (in which case nothing goes wrong) and the guard is also ineffective.

The strength of the protection provided by the subject matter described herein comes from primarily two factors:

1. The probability of results (a) and/or (b) of step 206 occurring is very low; and 2. A substantial number of guards are used, so that the probability that all the results are correct is negligible. A small AppX might have 10-15 guards; a larger AppX will have many more.

Example 1

The following are examples of codemarks that can be "reduced" (by taking subsets) to a single word or byte for use by the guards. Below are sources of codemarks useful to protect the AppX. There are wide variations in their complexity and ease of use.

Email: jmt@agency.osu.com stratis@hpclab.ceid.upatras.gr

Words: Zairhaimenot, Eremitani, 尊享毗邻故宫的现, Elchbaumle

Contacts: http://www.lawyers.com/WLafayette/Ingaborg-MacLane-128419-a.html

Picture legends: "Ship lounge—NAR", "Tom & Gail", "Iguana sunning & sea lion"

Music: 09—Catari (Cor'ngrato)

Favorites: http://www.magidfireplaces.com/index1.html

One can also create artificial codemarks by various means, for example:

Insert small, innocuous programs with codemarks into the System, e.g., replace the word student with pupil.

Make insignificant changes in constants, e.g., 17.25 becomes 17.250007, 63.8 becomes 62.79997

Make safe code re-arrangements, e. g., rewrite P=2, X=5, K=12, B=4, as K=12, X=5, B=4, P=2.

Create a "general purpose" secure "codemark area" with codemarks (random numbers, symbols and letters) for applications to use. This can be done for the whole system (this also needs extra security) or just one application (not likely). Caveat: Attackers can often discover this tactic.

Place extra data in lists, names, etc. For example, suppose the array List uses at most 69 items and has dimension 75. Then set List(72)=K. Caveat: Attackers can also often discover this tactic, however, good obfuscation prevents detection (or, at least, occupies the pirates for quite some time).

Add artificial email addresses, e. g., such as pkrice@cs.purdue.edu, gboehme@roadrunner.com.

Example 2

The following is a preferred way of inserting codemark values into the protection of the AppX:

Letting M1, M2 and M3 be codemark values, the preferred code protection steps are:

1. Insert the codemark values into the local code to disguise codemark dependencies
a1=Value(M1) a2=Value(M2) a3=Value(M3)

2. Create identities with constant values, e.g.
IDENT2(a1, a2, a3)=2 IDENT5(a1, a2, a3)=5

3. Replace some of the constants 2 and 5 in the AppX by these identities.

4. Obfuscate these computations to hide the dependency on the codemark values.

Example 3

The following examples of guards use numeric codemark values for clarity, while protections can also use alphanumeric values. The actions due to incorrect guard values may be unknown, but they have a very high probability of causing incorrect actions. One can combine and obfuscate the guards and codemarks to create more complex protection with such tests as: If(TestX is met and codemark B is incorrect), then take defensive action.

Example 3A

A Simple Silent Guard

Let M1=7 be the correct codemark value and insert
If (M1>8) Const13=A4*2+4.
This should cause incorrect computations where Const13 is used later if M1 is increased.

Example 3B

A More Complex Silent Guard

The notation used is: address followed by instruction and omitted instructions are not involved in the protection.
Original code (with M1=2 and M2=7)
650 V1=8*M1+1 (=17)
665 V2 =21*M2+1 (=128)
682 If(X=2) Go to Address 2733

After the AppX is protected, the values 17 and 128 become guard values and variables V1 and V2 become codemarks with these values. The protected AppX has instructions 650 and 665 unchanged plus new instructions that are inserted such as the following 6 Guard Codes:
653 AX1=V1−15    663 AX4=AX1+AX2
655 AX2=V2/16    664 AX5=AX3−AX4−1
661 AX3=V3*3     682 If(X=AX5) Go to Address 2733

If the value of M1 or M2 is changed, then the result of statement 682 is very likely to be changed. The control flow need not be "straight line" from statement 650 to 682, but there must not be any program entry between 663. and 682. The values M1 and M2 need not be simple codemarks—they can be derived from other variables or can depend on other data, e.g., one has M1=Z9+14*W23 where Z9 is a codemark and W23 is set elsewhere.

Example 3C

A Delayed Guard

Its basic components are triggers (see from Example 3B) and frequency. The following three statements are preferably scattered in the AppX and obfuscated:
Trigger=0    Test=Time−Limit    If (Test≥0) Trigger=1
The guard becomes (before obfuscation): If (Trigger=1 and M1≠M1true), then the AppX takes defensive action.

Example 3D

A More Complex Delayed Guard

An obfuscated and delayed silent guard could have statements 650 and 661 above unchanged plus the 4 new statements:
652a J=0         658a If(Test>0) J=1
654a Test=Time−Limit    674 X5=2*(1−J)+(X3−X4−1)*J.

Example 3E

Joint Silent Guards

Let M1 and M2 be codemark values. Then adding $(M1^2 2M1*M2+M2^2)-(M1+M2)^2$ into an expression does not change the results and creates a joint guard from M1 and M2. This guard can be "obfuscated" and there are many simple identities that can be used to create guards.

Example 3F

An Indeterminate Guard

Let V be a code variable to be protected. Then compute and save T1=M1+6, T2=M1+2. Next, insert somewhere later the code such as:
If (T1+T2=2V+8) then V=4.07.
The effect of this change in the value of V is unknown, but AppX is very unlikely to operate properly then.

Example 3G

Multiple Use of "Large" Codemark Items

One can use a "larger" codemark value B multiple times in independent silent guards. One "extracts" pieces of B by taking subsets to create simple codemarks.
For example, if codemark B=87925, then one creates new codemarks B1, B2 and B3 (using integer arithmetic):
B1=B/100−861, B2=B/1000−112, B3=B/897−6
Their values are (and should continue to be) 15, 25 and 11.
It is unlikely that ordinary software maintenance adversely affects the protection, but it might (e.g., an upgrade of the entire system) and, if so, one must "re-protect" the AppX. A change in ownership of the System (thereby changing many codemark values) or moving the System to a new hardware platform may also require re-protection. This should be done by the vendor of the AppX who could provide "updates" along with the reinstallation as a service and incentive. The vendor could also "disable" the old code while reinstalling the System as the vendor would know the protection details.

Installation Requirements

The requirements for installing the piracy protection in the AppX provided by the subject matter described herein may include the following:
a. Locations and values of the possible types of codemarks. One can assume the installer would know these.
b. A guard has 2 pieces designated, for example, designated Code1 and Code 2 where Code 1 uses a codemark and Code2 uses the output of Code1. The path from Code1 to Code2 need not be direct or immediate. A branch can occur between Code1 and Code2 so that Code2 might not be executed at times. This creates delayed or intermittent (or even no) guarding.
c. Procedures to create the new code inserted. There should (and can) be a wide variety in the guards.
d. Procedures to obfuscate and tamperproof the resulting code.

To install the protection, the vendor preferably analyzes the AppX to identify preferred guard locations and the program "variables" and "information" they use (such as M1, M2, and M3 above). The "foundations" for these guards might already be installed in the AppX. The AppX vendor then has a "catalog" of guard templates and potential locations "available" for protecting the AppX. Some guards may require different properties or locations.

An installer program installs the AppX and initiates the piracy protection by identifying (and possibly creating artificial) codemarks in the System. These form a "permanent and protected" set of System codemarks. The installer program is normally written by the AppX developers as it requires intimate knowledge of the AppX. The AppX developers know where codemark values can be used strategically. One might also insert codemarks into "standard" components of the System, but this requires detailed knowledge of the System plus appropriate authorization. Some attacks may identify such codemarks. Nevertheless, such extra codemarks significantly hinder "ordinary" pirates and keep "professional" pirates occupied for a while. In addition, one can always obfuscate and render tamper-proof the AppX. Obfuscation can be done before installation, after installation, or both. "Both" is preferred as it gives a more difficult task to the attacker, while also adding extensive effort so he/she may decide it is not worth the trouble. The choice depends on the nature of the AppX and its market.

If the AppX is being installed on a virtual system controlled by a pirate, the pirate can identify the codemarks (and perhaps some guards) to provide information to help create a pirated version of the AppX. The pirated version of the AppX would run slower but otherwise perform the same as the original AppX. This requires much more work than copying the AppX, but less work than is required to re-create or decipher the AppX.

Figure 3:
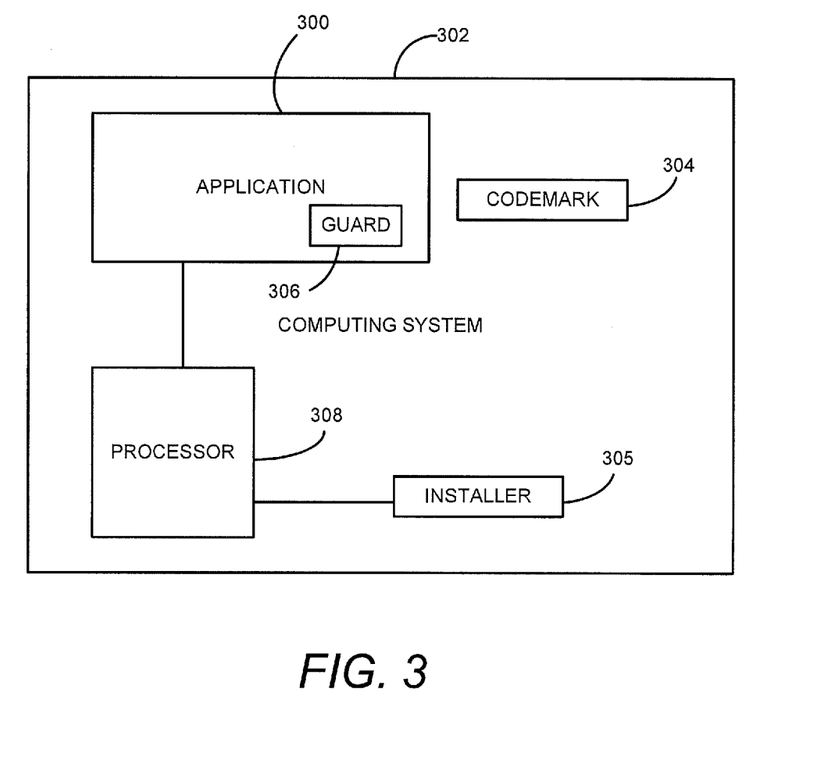
FIG. 3 is a block diagram illustrating an exemplary system for preventing software piracy using silent guards and codemarks according to an embodiment of the subject matter described herein.

FIG. 3 is a block diagram illustrating an exemplary system for preventing software piracy using guards and codemarks according to an embodiment of the subject matter described herein. Referring to FIG. 3, an application 300 may be installed on a computing system 302. In order to prevent piracy of application 300, codemarks 304 associated with computing system 302 may be identified. Codemarks 304 are preferably intrinsic to computing system 302 and may be consistent with any of the examples described above. Codemarks 304 may also be generated by installer 305, as described above. The developer of application 300 may specify one or more guards 306. Guards 306 utilize codemarks 304 to produce values. In one example, a guard 306 may include a first code portion that produces an output based on a codemark 304. The guard 306 may include a second code portion that uses the output of the first code portion. Application 300 may include a protection mechanism that is selectively triggered based on the output of the second code portion of guard 306. For example, application 302 may malfunction if the value produced by the second code portion is incorrect. Computing system 302 may include a processor 308, implemented at least partially in hardware, on which application 300, installer 305, and guard 306 execute.

Document Protection

In one embodiment of the subject matter described herein, application 102 may be a document reader, and the system illustrated in FIG. 3 and the methods described herein may be used to protect digital documents. Digital documents exist as bit strings that are made readable by computer programs. Let Reader be the program that accesses a digital document Doc and processes the information to display it for reading. The computer program Microsoft Word® is an example of a Reader, which may be modified, for example, with a plug-in, to protect documents and prevent piracy using the steps described herein. Alternatively, a new reader program that provides document protection and piracy prevention may be used to implement the subject matter described herein. Doc can be protected by requiring either a password provided by Reader or biometrics (e. g., fingerprints, voiceprints, faceprints) provided by a person or both. A Reader could also require a physical key and there could be one Reader for many documents. Once Reader and Doc are open, one executes Reader(Doc) to display Doc. A method is presented here to protect Doc so an authorized person can view Doc but one cannot extract a readable form for use elsewhere from its computer representation.

Doc is protected first by tying Reader and the computer system Syst together using the software piracy protection method described herein. Then Doc is tied to Reader using password protection capable of withstanding supercomputer attacks. This is feasible as one can "embed" the very strong passwords needed in the code of Reader and they need not be known or used by a person. Thus Doc is protected as Reader is useless if it is removed from Syst.

Figure 4:
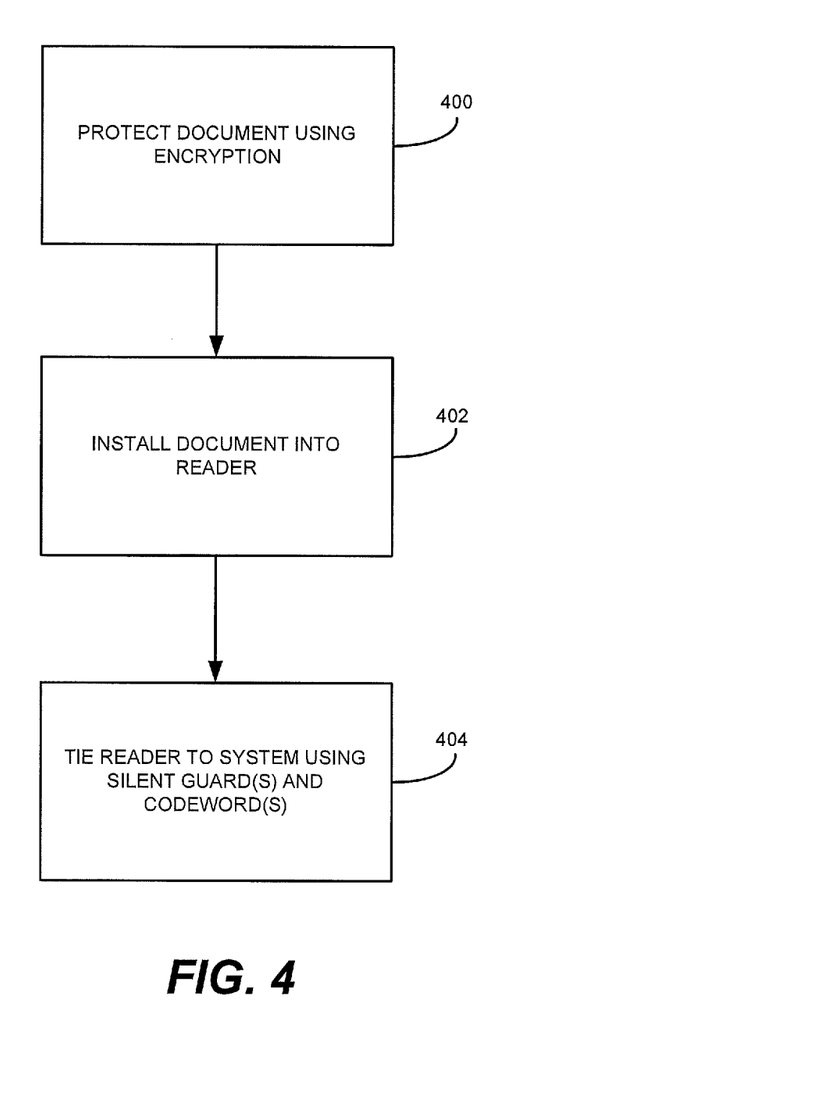
FIG. 4 is a flow chart illustrating an exemplary method for protecting digital documents according to an embodiment of the subject matter described herein.

The steps to protect a single document Doc are illustrated in FIG. 4 and described below:

1. Protect Doc using encryption with a password capable of withstanding supercomputer attacks. Optionally, Reader could also require a physical key or check the biometric data of the person involved (step 400).
2. Install Doc into Reader along with its password (step 402). In one example, a reader may have an "in" facility where one inserts a document, pushes the READ button and loads the document into the reader. The reader used may be specific to the document or, more likely, to a group of protected documents. Using one reader for each document provides the strongest protection, but the gain over a multidocument reader is minor and the cost is high.
3. Tie Reader to Syst (step 404).

The code of Reader may then be obfuscated and tamper-proofed for further protection.

Figure 5:
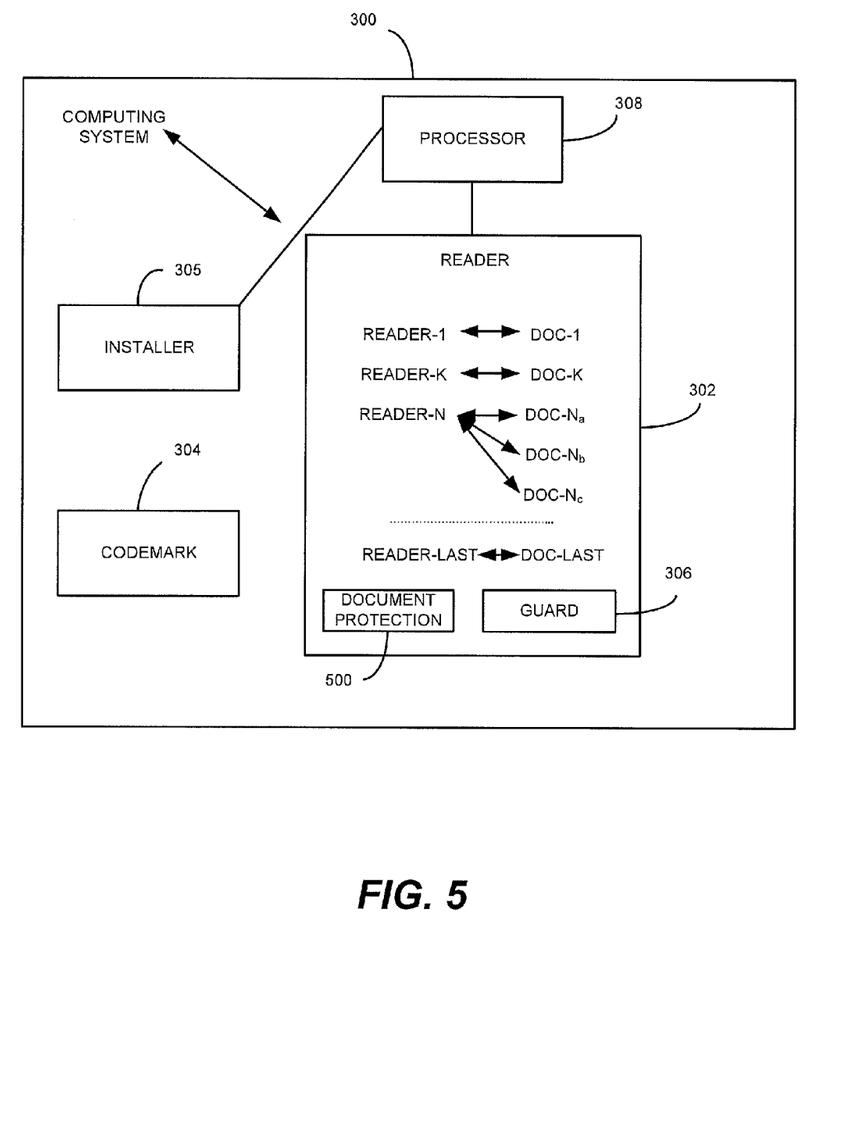
FIG. 5 is a block diagram of a system for protecting digital documents according to an embodiment of the subject matter described herein.

FIG. 5 is a block diagram illustrating an exemplary system for protecting documents using encryption, silent guards, and codemarks according to an embodiment of the subject matter described herein. In FIG. 5, computing system 302 may be a general or special purpose computing platform capable of executing a reader 300. Reader 300 may be a program, such as a word processing or document display program. Reader 300 and subcomponents thereof may be tied to computing system 302 using silent guards 306 and codemarks 304 as described above. Codemarks 304 may be intrinsic to computing system 302 or generated by an installer 305. Computing system 302 may include a processor 308, at least partially implemented in hardware, that executes reader 300, guard 306, and installer 305, as described above with respect to FIG. 3. Reader 300 may include document protection module 500 that encrypts documents using an encryption algorithm. The encryption algorithm may be symmetric or asymmetric. Document protection module 500 may present the user with the option to encrypt a document and associate the document with a specific reader at the time a document is created or when the document is saved. Document protection module 500 may install the document into a specific reader, such as reader 300, along with a shared secret for accessing the document. The shared secret may be the key used to encrypt the document or a password usable by reader 300 to authenticate the user and access the decryption key, which may be the same key as the encryption key if a symmetric encryption algorithm is used to encrypt the document. If an asymmetric encryption algorithm is used to encrypt the document, the decryption key is different from the encryption key. Once the document and the shared secret are installed into the reader, the document can only be accessed using the reader and the shared secret.

This protection method can be extended to many documents by creating READERS with "sub-readers"; one for each document. The sub-readers would have individual passwords. One could also have a large READER 300 where each document Doc-k (or group of documents) has its own Reader-k. Then READER is tied to Syst by silent guards and each Reader-k is tied to Doc-k as above. The arrows in FIG. 5 below denote these "ties" and the organization of a large scale document protection system READER is illustrated in FIG. 5.

The steps to access a document Doc-k in READER are:
(1) Open READERS with its password PassR (plus its biometric and/or physical keys if needed).
(2) Open Reader-k and Doc-k using their passwords, biometrics and/or keys.
(3) Decrypt Doc-k using its password Pass-k and execute Reader-k(Doc-k) to display Doc-k.

The READER 300 could also allow an authorized person or program to print Doc-k.

The principal attack method (supercomputer trial and error) and its countermeasures are described briefly in the Appendix. Document protection with very high security requires that extraordinary passwords (both very long and using a wide range of characters) be used. Supercomputer attacks can also be negated by introducing delays when many passwords are tried in a short time. For example, one could have Reader make delays such as If over 100 password failures occur in 1 minute then delay machine access for 1 minute.
If over 1,000 password failures occur in 1 minute, then delay machine access for 1 hour.
If over 10,000 password failures occur in 1 hour, then delay machine access for 12 hours.
If over 1,000,000 password failures occur in 12 hours, then shut down the computer.

While the present subject matter has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for preventing software piracy, the method comprising: specifying a codemark that is intrinsic to a computing system; providing an application with a first embedded silent guard, the first embedded silent guard including a first portion that uses the codemark and produces a guarded value that depends on the codemark, the first silent guard further including a second portion that uses the guarded value as a value for an ordinary program variable in the application and that produces an output that depends on the guarded value; executing the first and second portions, wherein the second portion causes the application to malfunction or take another protective action when the guarded value is not equal to an expected value; and providing a second silent guard embedded in the application.

2. The method of claim 1 wherein the first silent guard is located in a portion of the application that is not executed every time the application is executed.

3. The method of claim 1 wherein the second silent guard computes, independently from the first silent guard, a second guarded value.

4. The method of claim 3 wherein the second silent guard includes a first portion that computes the second guarded value and a second portion that uses the second guarded value as a value for an ordinary program variable.

5. The method of claim 1 wherein the first and second silent guards are configured to operate at different times.

6. The method of claim 1 wherein the first silent guard computes a new value for a constant used by the application.

7. The method of claim 1 wherein the codemark comprises a user specific value.

8. The method of claim 7 wherein the codemark is embedded in the application.

9. The method of claim 7 wherein the codemark is located outside of the application.

10. A system for preventing software piracy, the system comprising: a computing system including at least one processor; a codemark intrinsic to the computing system; and an application configured to execute on the processor, wherein the application includes a first silent guard including a first portion that uses the codemark and produces a guarded value that depends on the codemark, the first silent guard including a second portion that uses the guarded value as a value for an ordinary program variable in the application and that produces an output that depends on the guarded value, wherein the application is configured to execute the first and second portions, wherein the second portion causes the application to malfunction or take another protective action when the guarded value is not equal to an expected value and wherein the application includes a second silent guard embedded in the application.

11. The system of claim 10 wherein the first silent guard is located in a portion of the application that is not executed every time the application is executed.

12. The system of claim 10 wherein the second silent guard computes, independently from the first silent guard, a second guarded value.

13. The system of claim 12 wherein the second silent guard includes a first portion that computes the second guarded value and a second portion that uses the second guarded value as a value for an ordinary program variable.

14. The system of claim 10 wherein the first and second silent guards are configured to operate at different times.

15. The method of claim 10 wherein the first silent guard computes a new value for a constant used by the application.

16. The system of claim 10 wherein the codemark comprises a user specific value.

17. The system of claim 16 wherein the codemark is embedded in the application.

18. The system of claim 16 wherein the codemark is located outside of the application.

19. A non-transitory computer readable medium having stored thereon executable instructions that when executed by a processor of a computer control the computer to perform steps comprising: storing a codemark on a computing system; executing an application with a first embedded silent guard, the first silent guard including a first portion that uses the codemark and produces a guarded value that depends on the codemark, the first silent guard further including a second portion that uses the guarded value as a value for an ordinary program variable in the application, wherein the ordinary program variable produces an output that depends on the first guarded value; executing the first and second portions, wherein the second portion causes the application to malfunction or take another protective action when the guarded value is not equal to an expected value and wherein the application includes a second embedded silent guard.

20. A method for preventing unauthorized access to a document, the method comprising: encrypting a digital document using an encryption algorithm; installing the encrypted digital document and a shared secret for decrypting the digital document into a reader application such that the digital document can only be viewed using the reader application and the shared secret; and tying the reader application to a computing system using a first silent guard and a codemark, wherein the first silent guard includes a first portion that uses the codemark and produces a guarded value that depends on the codemark, the first silent guard further includes a second portion that uses the guarded value as a value for an ordinary program variable in the reader application and that produces an output that depends on the guarded value, wherein the second portion causes the reader application to malfunction or take another protective action when the guarded value is not equal to an expected value and wherein a second silent guard is embedded in the reader application.

21. The method of claim 20 wherein encrypting the document includes using an encryption algorithm and a key, wherein the reader application requires a password or the key before the document can be opened using the reader application.

22. The method of claim 20 wherein the second silent guard computes, independently from the first silent guard, a second guarded value.

23. The method of claim 22 wherein the second silent guard includes a first portion that computes the second guarded value and a second portion that uses the second guarded value as a value for an ordinary program variable.

24. The method of claim 20 wherein the first and second silent guards are configured to operate at different times.

25. The method of claim 20 wherein the first silent guard computes a new value for a constant used by the application.

26. The method of claim 20 wherein the codemark comprises a user specific value.

27. The method of claim 26 wherein the codemark is embedded in the reader application.

28. The method of claim 26 wherein the codemark is located outside of the reader application.

29. A system for preventing unauthorized access to an electronic document, the system comprising: at least one hardware processor coupled to a memory, the memory storing a document protection module that is executed by the at least one hardware processor; a reader application for displaying digital documents on a computing system; the document protection module associated with the reader application for encrypting a digital document using an encryption algorithm and for installing the encrypted digital document and a shared secret for decrypting the digital document into a reader application such that the digital document is only viewed using the reader application and the shared secret; and a first silent guard associated with the reader application, wherein the first silent guard includes a first portion that uses a codemark and produces a guarded value that depends on the codemark, the first silent guard further includes a second portion that uses the guarded value as a value for an ordinary program variable in the application and that produces an output that depends on the guarded value, wherein the second portion causes the reader application to malfunction or take another protective action when the guarded value is not equal to an expected value and wherein a second silent guard is embedded in the reader application.

30. The system of claim 29 wherein the document protection module is configured to encrypt the document using an encryption algorithm and a key, wherein the reader application requires a password or the key before the document can be opened using the reader application.

31. The system of claim 29 wherein the second silent guard is configured to compute, independently from the first silent guard, a second guarded value.

32. The system of claim 31 wherein the second silent guard includes a first portion that computes the second guarded value and a second portion that uses the second guarded value as a value for an ordinary program variable.

33. The system of claim 29 wherein the first and second silent guards are configured to operate at different times.

34. The method of claim 29 wherein the first silent guard computes a new value for a constant used by the application.

35. The system of claim 29 wherein the codemark comprises a user specific value.

36. The system of claim 29 wherein the codemark is embedded in the reader application.

37. The system of claim 29 wherein the codemark is located outside of the reader application.

38. The system of claim 29 wherein the reader application includes a plurality of sub-readers, each sub-reader being tied to a specific document.

39. A non-transitory computer readable medium having stored thereon executable instructions that when executed by a processor of a computer control the computer to perform steps comprising: encrypting a digital document using an encryption algorithm; installing the encrypted digital document and a shared secret for decrypting the digital document into a reader application such that the digital document is only viewed using the reader application and the shared secret; and tying the reader application to a computing system using a silent guard and a codemark, wherein the silent guard includes a first portion that uses the codemark and produces a guarded value that depends on the codemark, the silent guard further includes a second portion that uses the guarded value as a value for an ordinary program variable in the application and that produces an output that depends on the guarded value, wherein the second portion causes the reader application to malfunction or take another protective action when the guarded value is not equal to an expected value and wherein the reader application includes an embedded second silent guard.

* * * * *